(12) United States Patent
Krulce et al.

(10) Patent No.: US 9,170,676 B2
(45) Date of Patent: Oct. 27, 2015

(54) ENHANCING TOUCH INPUTS WITH GESTURES

(71) Applicant: QUALCOMM Incorporated, San Diego, CA (US)

(72) Inventors: Darrell L. Krulce, San Diego, CA (US); Francis B. MacDougall, Toronto (CA); Virginia Walker Keating, San Diego, CA (US); Andrew J. Everitt, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 13/842,891

(22) Filed: Mar. 15, 2013

(65) Prior Publication Data

US 2014/0267084 A1    Sep. 18, 2014

(51) Int. Cl.
*G06F 3/041* (2006.01)
*G06F 3/01* (2006.01)
*G06F 3/0488* (2013.01)

(52) U.S. Cl.
CPC .............. *G06F 3/0416* (2013.01); *G06F 3/017* (2013.01); *G06F 3/0488* (2013.01); *G06F 2203/04101* (2013.01); *G06F 2203/04104* (2013.01); *G06F 2203/04806* (2013.01)

(58) Field of Classification Search
CPC ................. G06F 3/0416; G06F 3/017; G06F 2203/04806; G06F 2203/04101; G06F 2203/04104; G06F 3/0488
USPC ......................................................... 345/173
See application file for complete search history.

(56) References Cited

U.S. PATENT DOCUMENTS

| 2005/0052427 | A1 | 3/2005 | Wu et al. |
| 2010/0104134 | A1* | 4/2010 | Wang et al. ................. 382/103 |
| 2011/0122070 | A1* | 5/2011 | Smith et al. ................. 345/173 |
| 2011/0234543 | A1 | 9/2011 | Gaerdenfors et al. |
| 2011/0254791 | A1 | 10/2011 | Wong et al. |
| 2012/0068941 | A1 | 3/2012 | Arrasvuori et al. |
| 2012/0092277 | A1 | 4/2012 | Momchilov |
| 2013/0257753 | A1* | 10/2013 | Sharma et al. ................. 345/173 |

FOREIGN PATENT DOCUMENTS

WO    2008094791 A2    8/2008

OTHER PUBLICATIONS

Huppmann D., et al., "Exploring and Evaluating the Combined Multi-Touch and In-the-Air Tabletop Interaction Space," 2012, 12 pages.
International Search Report and Written Opinion—PCT/US2014/023704—ISA/EPO—Jul. 2, 2014.

(Continued)

*Primary Examiner* — Charles V Hicks
(74) *Attorney, Agent, or Firm* — Kilpatrick Townsend Stockton LLP

(57) ABSTRACT

Methods and systems according to one or more embodiments are provided for enhancing interactive inputs. In an embodiment, a method includes concurrently capturing touch input data on a screen of a user device and non-touch gesture input data off the screen of the user device. The method also includes determining an input command based at least in part on a combination of the concurrently captured touch input data and the non-touch gesture input data. And the method further includes affecting an operation of the user device based on the determined input command.

31 Claims, 7 Drawing Sheets

(56) References Cited

OTHER PUBLICATIONS

Ketabdar H., et al., "Magi Write: Towards Touchless Digit Entry Using 3D Space Around Mobile Devices", Proceedings of the 12th International Conference on Human Computer Interaction with Mobile Devices and Services, Sep. 10, 2010, pp. 443-446.

Kim D., et al., "Digits: Freehand 3D interactions anywhere using a wrist-worn glove less sensor" Proceedings of the 25$^{th}$ Annual ACM Symposium on User Interface Software and Technology, Oct. 7, 2012, pp. 167-176.

Sato M., et al., "Touché: Enhancing Touch Interaction on Humans, Screens, Liquids, and Everyday Objects", Proceedings of the 2012 ACM Annual Conference on Human Factors in Computing Systems, CHI '12. May 10, 2012, pp. 483-492.

Zeng X., et al., "Thumb Widgets: Apply Thumb-Tracking to Enhance Capabilities of Multi-touch on Mobile Devices", CHI 2013: Changing Perspectives, pp. 1281-1286.

* cited by examiner

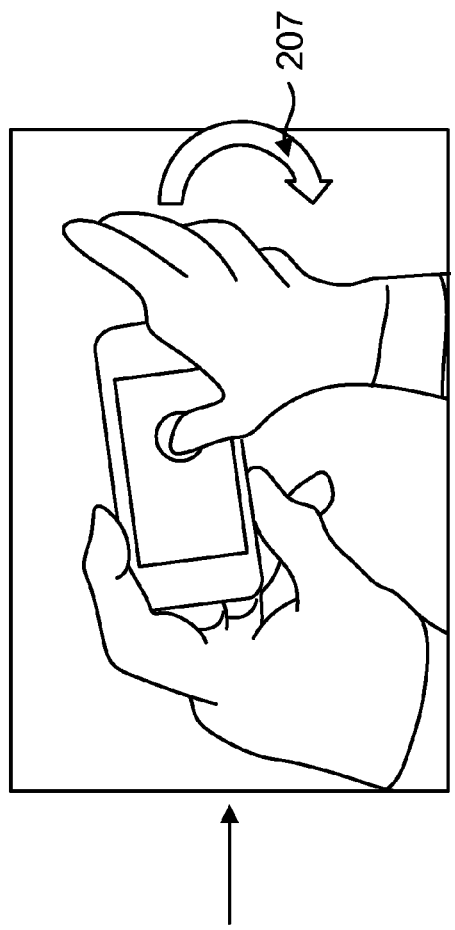
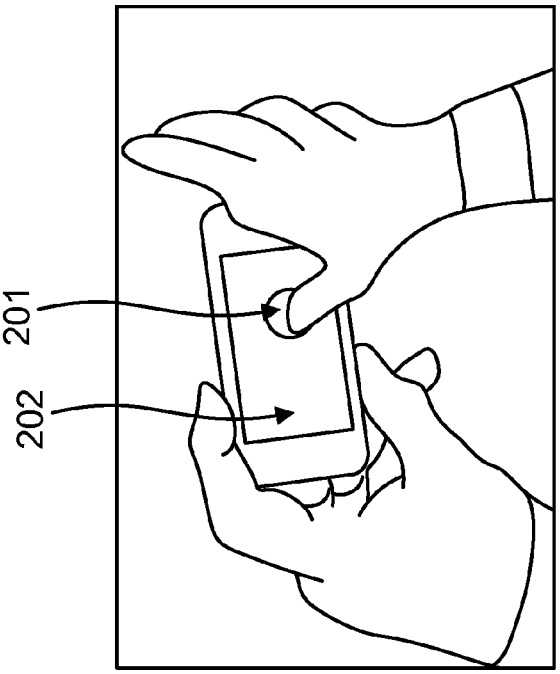
FIG. 2B
FIG. 2A

ENHANCING TOUCH INPUTS WITH GESTURES

TECHNICAL FIELD

The present disclosure generally relates to interactive inputs on user device interfaces.

BACKGROUND

Currently, user devices (e.g., smart phones, tablets, laptops, etc.) having interactive input capabilities such as touch screens generally have small-sized screens. Such small-sized screens may limit the interactive input capabilities. For example, a small-sized screen may impede interactions such as smooth scrolling, panning, zooming, etc. Touch interactions may require a user to perform repeated actions to perform a task such as multiple pinches, selects, or scroll motions on a touch screen of the user device. Further, touch inputs may obscure the screen of the user device making it difficult to see the affected content.

Accordingly, there is a need in the art for enhancing interactive inputs on user device interfaces.

SUMMARY

Systems and methods according to one or more embodiments of the present disclosure provide enhanced interactive inputs such that touch input data may be fused with non-touch input data (e.g., detected from gestures performed with a control object such as a position or motion of a hand, finger, etc.), which may be detected by sensors such as ultrasound sensors, image or video capturing capabilities (e.g., camera), depth sensors, or the like. Advantageously, the view of a user device's interface, e.g., a display or screen, may remain substantially unobstructed.

According to an embodiment, a method comprises concurrently capturing touch input data on a screen of a user device and non-touch gesture input data off the screen of the user device; determining an input command based at least in part on a combination of the concurrently captured touch input data and the non-touch gesture input data; and affecting an operation of the user device based on the determined input command.

According to another embodiment, a method comprises concurrently detecting, at a user device, a touch on a screen of the user device and at least one of a pose of at least a portion of a hand which is not touching the user device and a motion of the portion substantially in a plane substantially parallel to the screen; determining a command based at least in part on a combination of the detected touch and the detected pose or motion; and adjusting operation of the user device based on the determined command. In an embodiment, the portion of the hand comprises another portion of the hand used to touch the screen. In another embodiment, the method further comprises determining that the portion of the hand comprises another portion of the hand used to touch the screen prior to determining the command. In another embodiment, detecting the pose or the motion further comprises identifying one or more extremities of the hand. In another embodiment, the hand is different than a hand used to touch the screen. In another embodiment, the motion comprises a swipe. In another embodiment, the motion comprises a rotation or a sweep. In another embodiment, the portion of the hand is outside of a volume which comprises the screen and a perpendicular extension of the screen which is perpendicular to the screen. In another embodiment, detecting the touch further comprises detecting a plurality of touches on the screen. In another embodiment, a location of the touch on the screen identifies the operation or an object to adjust. In another embodiment, detecting the touch further comprises detecting a movement of the touch along the screen, wherein the determining the command comprises determining the command based at least in part on a combination of the detected touch movement and the detected pose or motion. In another embodiment, the detected pose or motion comprises a detected pose. In another embodiment, the detected pose or motion comprises a detected motion. In another embodiment, the detected pose or motion comprises a detected motion performed while the portion of the hand is in a detected pose.

BRIEF DESCRIPTION OF THE DRAWINGS

FIGS. 2A-2B are diagrams illustrating a flow for enhancing touch with non-touch gestures according to another embodiment of the present disclosure. Figs. have been revised.

DETAILED DESCRIPTION

Figure 1A:
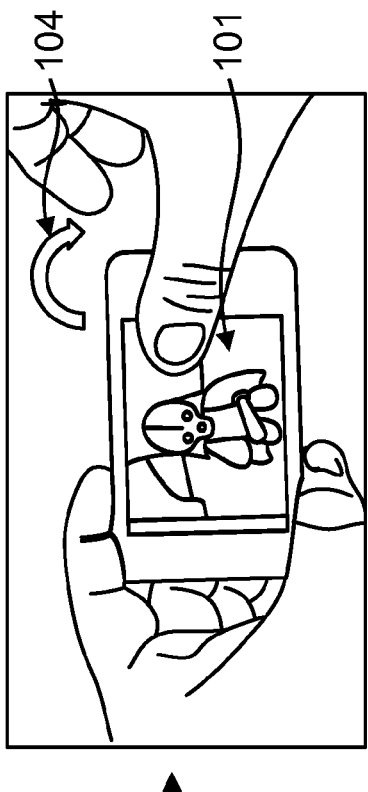
FIGS. 1A-1C are diagrams illustrating a flow for enhancing touch with non-touch gestures according to an embodiment of the present disclosure.

Systems and methods according to one or more embodiments of the present disclosure are provided for enhancing interactive inputs such as touch inputs with off-screen non-touch inputs (e.g., gestures), for example via simultaneous multimodal sensor fusion. Non-touch inputs may include gestures, such as a pose or motion, performed with a control object such as a hand, finger, etc., which may be detected by sensors such as ultrasound sensors, image or video capturing capabilities (e.g., camera), depth sensors, or the like. In that regard, sensors or technologies configured to detect non-touch inputs may be included in a user device or system and/or located on various surfaces of the user device, for example, on a top, a bottom, a left side, a right side and/or a back of the user device such that non-touch data such as gestures may be captured when they are performed directly in front of the user device (on-screen) as well as off a direct line of sight of a screen of a user device (off-screen). In general, off-screen non-touch inputs may also be referred to as "off-screen gestures" hereinafter, wherein "off-screen gestures" may refer to position or motion data of a control object such as a hand, a finger, a pen, or the like, where the control object is not touching a user device, but is proximate to the user device. Not only may these "off-screen" non-touch gestures be removed from a screen of the user device, but they may include a portion of the control object being laterally offset from the device with respect to a screen or display of a device. For example, a volume can be imagined that extends away from a display or screen of a device in a direction that is substantially perpendicular to a plane of the display or screen. "Off-screen" gestures may comprise gestures in which at least a portion of a control object performing the gesture is outside of this volume. For example, in FIGS. 1A-1C and 2A-2B, a user's fingers are "off-screen."

Concurrent interactive inputs such as touch inputs and off-screen non-touch inputs (e.g., gestures) may create advanced commands. In an embodiment, a user may touch a target item displayed on a screen of a user device and simultaneously use off-screen gestures (e.g., fingers on the same hand or on the other hand) to adjust an aspect of the target item.

Off-screen non-touch gestures may include any suitable pre-defined gesture corresponding to adjusting a particular aspect of the target item. For example, a particular hand motion or position may be used for adjusting a setting, e.g., a downward hand motion may correspond to decreasing a brightness setting of a screen.

Touch input-sensing data and non-touch, off-screen input-sensing data (hereinafter referred to as "gesture input-sensing data") may be substantially concurrently captured such that these input-sensing data sets may be combined to create one input command. That is, novel complex commands may be enabled such that an input target and a variable adjustment of the input target may be combined. It should be noted that in various embodiments, there may be a minimal or negligible offset between when a gesture such as a motion starts or ends and when a touch input is detected. In some embodiments herein, touch input-sensing data and gesture input-sensing data may be captured substantially concurrently or contemporaneously, for example to allow a small leeway between the timing of touch and gesture.

In various embodiments, gesture input-sensing data may be captured by detection of an object's location and movement. For example, the detected movement of an object such as a hand or finger may be substantially parallel or in a same plane with a surface such as the display or screen of a user device, and may be performed off-screen rather than above screen. As such, blocking of the display or screen is avoided or reduced, thus permitting the screen to be visible.

There are many examples of complex commands that may combine an input target and a variable adjustment. Such examples may include adjusting one or multiple settings by using one or two hands, including the following:

Camera: selection of a target item via touch and non-touch gestures affecting the target item, e.g., to adjust focus, aperture, scene mode, etc. For instance, when taking a photo with a camera, a user may select an out-of-focus photo via touch (e.g., using an object such as a finger, a pen, etc.) while performing non-touch gestures that may be captured on a side of the camera to adjust the focus. In that regard, because the non-touch gestures may be performed off-screen (e.g., on a side, on top, on the bottom or behind the camera), the displayed photo is not obstructed from the user's view. This example will be illustrated in more detail below with respect to FIGS. 1A-1C according to an embodiment.

Settings: selection of a desired setting area or icon via touch and a gesture to adjust that setting or a setting associated with that icon, for example volume, brightness, etc. Similar to the camera example described above, a user may select a desired setting or icon representing a setting such as brightness via touch while performing a non-touch gesture that may be captured off-screen. The non-touch gesture may correspond to adjusting the brightness. In various embodiments, any command icon that is associated with a variable control may be touched and then the variability adjusted by a gesture such as sweeping or rotating the hand around. Thus, a second menu, for example with a slider bar for adjusting brightness, volume, etc. may not be required in some embodiments. Because the gesture is performed and captured off-screen, the display or screen is not obstructed from the user's view. For example, a user device may detect a touch input such as a user's thumb touching an icon representing brightness adjustment on a screen or on a side of a bezel of the user device. At the same time, the user device may detect a gesture such a user's fingers of the same hand (while touching the brightness icon) rotating to adjust brightness; for example, rotating to the right may increase brightness, and rotating to the left may decrease brightness.

Gaming: selection of an opponent via touch and a gesture such as a hand position or motion to set an action to perform on the opponent. Similar to the camera example described above, a user playing a game on a user device may select an opponent via touch while performing a non-touch gesture that may be captured off-screen. The non-touch gesture may correspond to setting an action to be performed on the opponent, and because the non-touch gesture is performed and captured off-screen, the display or screen of the user device is not obstructed from the user's view. For example, a user device may detect a touch input such as a user's thumb touching an icon representing an opponent's piece in a chess game displayed on a screen of the user device. At the same time, the user device may detect a gesture such a user's closing the same hand (while touching the icon representing the opponent's chess piece) to take out the chess piece according to the game rules.

Timer: selection of a timer area or icon via touch and a gesture to adjust duration. Similar to the camera example described above, a user may select a timer area or icon representing a setting such as timer duration via touch while performing a non-touch gesture that may be captured off-screen. The non-touch gesture may correspond to adjusting the timer duration and because it is performed and captured off-screen, the display or screen is not obstructed from the user's view. In an example, touching a clock and then rotating a hand one way or another may also be used to set the time (e.g., moving the time forward/backward may be determined by the number of fingers extended, which may distinguish between changing the hour or the minute). In another example, there may be just one way to adjust time, e.g., all rotations of a hand may adjust minutes.

Map: selection of a point of interest (POI) via touch and a gesture to adjust zoom, keeping the POI centered under the user's touch or hand. In one embodiment, users may move their touch to adjust where the POI is displayed on the screen. Similar to the camera example described above, a user may select a POI on a map displayed on a user device via touch while performing a non-touch gesture that may be captured off-screen. The non-touch gesture may correspond to adjusting the zooming and because it is performed and captured off-screen, the display or screen is not obstructed from the user's view.

Create different types of "clicks": selection of an object displayed on a screen of a user device via touch and a gesture for clicking on the selected object (e.g., for initiating an action on the selected object). For example, a user may select an object such as a file displayed on the screen of the user device via touch while performing a non-touch gesture that may be captured off-screen. A non-touch gesture may include a closed hand that may be equivalent to a right-mouse click (RMC), or an open hand that may be equivalent to a left-mouse click (LMC) or an alternate click. In some embodiments, other hand poses are used to represent RMC and/or LMC, or used to represent a different type of click.

Embodiments of the present disclosure may apply to many other use cases where complex commands may combine a touch input and a non-touch gesture for variable adjustment, including the following:

A user device may detect a touch input by a user touching an item with one hand (e.g., with a thumb while the hand is curled around the back of the user device to hold the device) and then swiping off-screen with the other hand. In an embodiment for a system that has "live tiles" (or other items with dynamic content), the swiping motion may scroll through the content (e.g. through email messages or up/down on a list). Conversely, this interaction may also work the other way, for example: the user device may detect touching of the item, which may keep the item anchored in place, while detection of a swiping gesture by the other hand may cause "home screens" to switch behind the item. When the user has located the correct home screen on which to place the item, the user may release the item by removing his thumb from the screen to "drop" the item on a currently displayed home-screen.

In various embodiments, the touch input may not have to be a static touch (or a single touch). Dragging items from one place to another may have a different effect based on a detected gesture, e.g., a hand pose, when dragging (e.g., one finger extended vs. whole hand open). Similarly, pinch zoom may have a different effect depending on a detected gesture, e.g., an open hand may affect a coarse zoom, and a closed hand may affect a fine zoom.

As described above, some use cases or examples may include adjusting one or multiple settings via a gesture using one or two hands. In some embodiments, it may matter whether the gesture is done with the same hand or a different hand. Thus, a user device may be configured in some embodiments to determine whether the same hand is touching the device and performing a gesture, e.g., a motion.

Advantageously, novel complex commands, for example novel complex input gestures, may be enabled that include both an input target and a variable adjustment. As such, a primary interface of a user device may be extended.

Figure 1B:
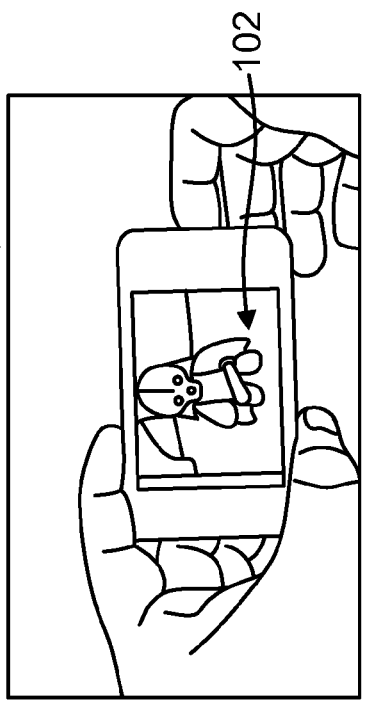
Figure 1C:
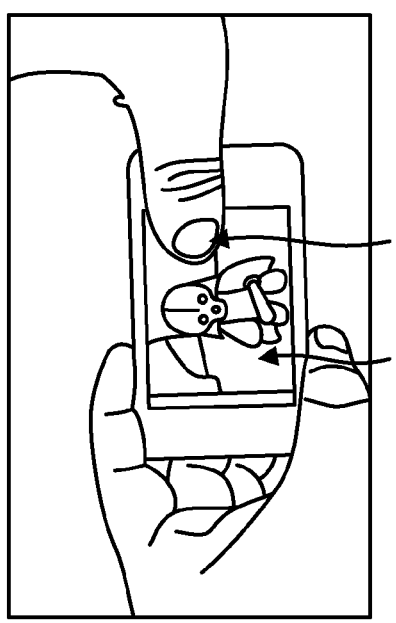

Referring to FIGS. 1A-1C, diagrams illustrate a flow for enhancing touch with non-touch gestures according to an embodiment of the present disclosure. In particular, FIGS. 1A-1C illustrate an example for adjusting focus of a touch target on a camera with a non-touch gesture.

In FIG. 1A, a user device 102 that may be a camera or that has a camera as part of the user device, includes a screen or camera view finder for viewing a target item. In this case, the target item appears to be out of focus. A user may touch the screen of user device 102 with an object such as a thumb at a point indicated by reference numeral 101 on the target item to be affected.

In FIG. 1B, the user performs an off-screen gesture to affect the target item. As can be seen in FIG. 1B, the user's fingers are laterally offset from the display of the device and thus may be detected as performing an off-screen gesture. In one example, in order to focus the target item, the user may rotate, on a substantially parallel plane to the screen of user device 102, his or her hand to focus the target item as indicated by reference numeral 104 while maintaining his or her thumb at point 101 on the target item. The non-touch gesture may be performed off-screen such that one or more sensors of the user device 102 (e.g., ultrasound technology sensors or the like) may capture the off-screen gestures. The user may perform the rotating non-touch gesture until the user deems that the target item is appropriately focused. In an embodiment, a user may touch anywhere on the screen of user device 102 in order to change focus, or in other embodiments, the user may touch on a specific object in order to refine autofocus.

In an embodiment, a user may touch a button, an area or an icon, which may be located proximate to an edge of the camera, for example, on the right side edge or close to a corner of the screen, such that the user may focus with non-touch gestures around the side or corner of the display. In this way, the display is not obstructed from view.

In FIG. 1C, the user may release the touch (e.g., disengage his or her thumb from point 101) from user device 102 to disengage from the target item.

In various embodiments, both gesture input-sensing data and touch input-sensing data may be stopped upon releasing a touch from the user device, e.g., upon releasing a touch from a screen or display of the user device.

As such, embodiments herein may provide a clean way to engage and disengage commands on a user device.

Referring now to FIGS. 2A-2B, diagrams illustrate a flow for enhancing touch with non-touch off-screen gestures according to another embodiment of the present disclosure. In particular, FIGS. 2A-2B illustrate an example of a shortcut for refreshing or scrolling a list or a page on a screen of a user device.

In FIG. 2A, a user may long press with a finger at a point 201 corresponding to a target item on a screen of a user device 202. In FIG. 2B, the user may perform a non-touch off-screen gesture, for example, moving a hand downwards as indicated by reference numeral 207 while pivoting on the finger pressing the target item at point 201. In this way, a list or a page on the user device may be easily refreshed or scrolled, for example without affecting other items on the screen. It should be noted that the non-touch gesture may be performed off-screen substantially along the same plane as the screen of the user device, that is, in a substantially parallel plane, regardless of proximity or distance in a perpendicular plane, i.e., in the z-direction, from the user device to the hand in motion.

In various embodiments, certain non-touch gestures may correspond to certain commands. In the example of FIGS. 2A-2B, a downward motion of a hand as indicated at reference numeral 207 may correspond to a "Refresh" command such as for refreshing a page. In other embodiments, the combination of touch and non-touch gesture inputs illustrated in FIGS. 2A-2B may be used as a shortcut to shuffle media. Such commands may be built-in and in some embodiments, a look up table may define which gestures correspond to which commands.

Figure 3A:
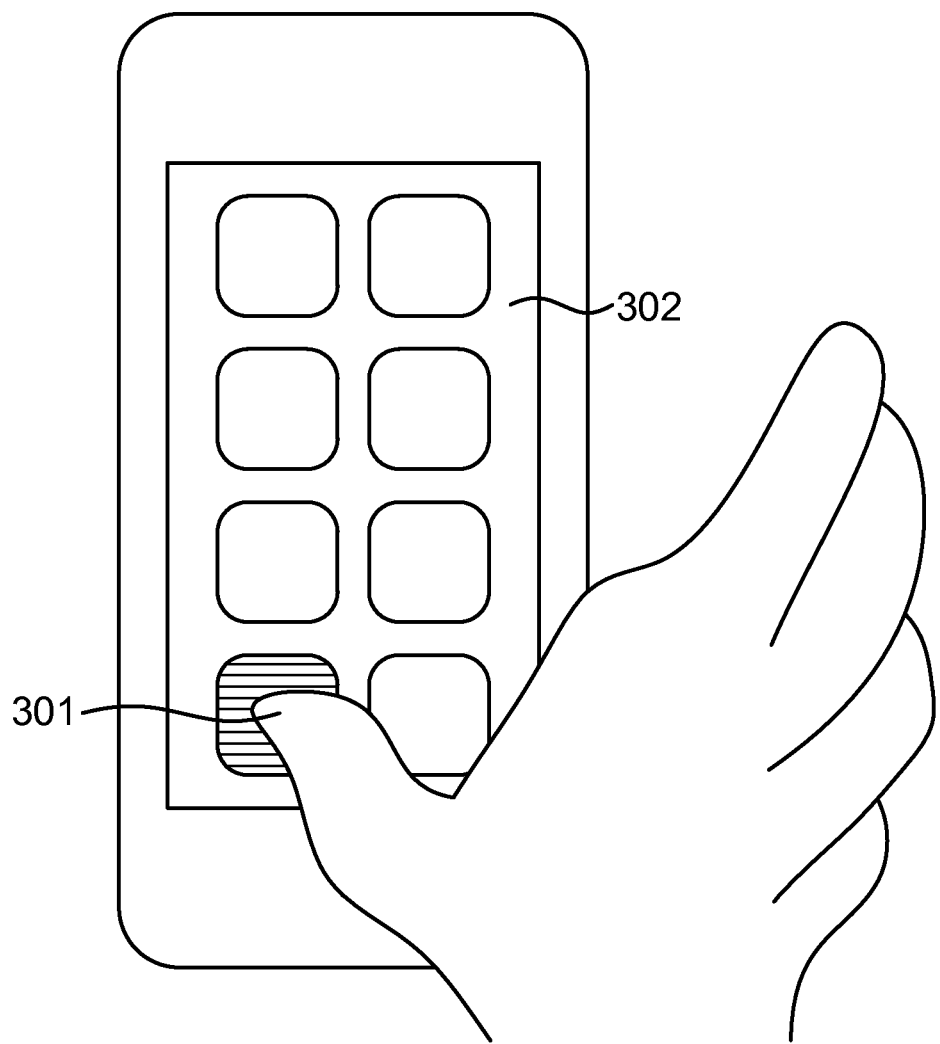
FIGS. 3A-3C are diagrams illustrating a flow for enhancing touch with non-touch gestures according to yet another embodiment of the present disclosure.
Figure 3B:
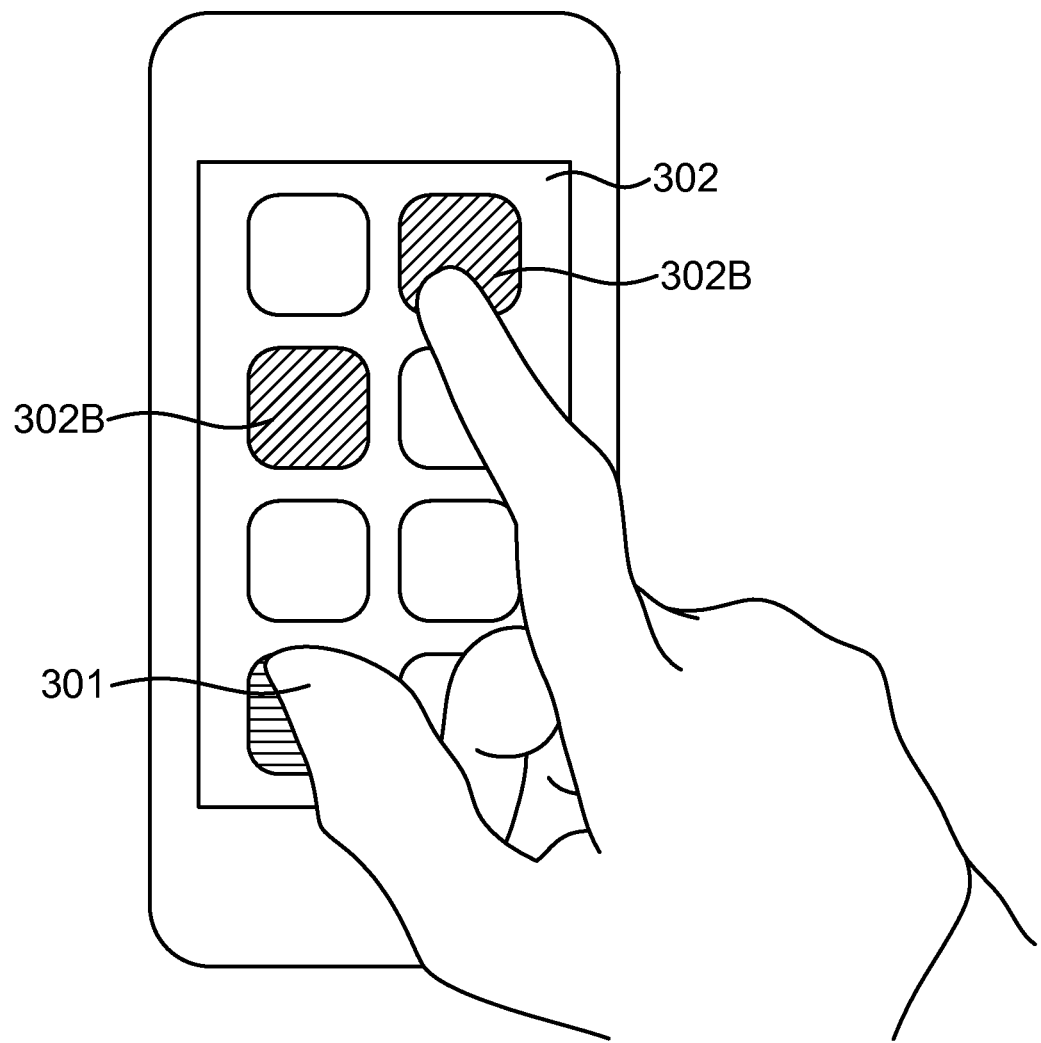
Figure 3C:
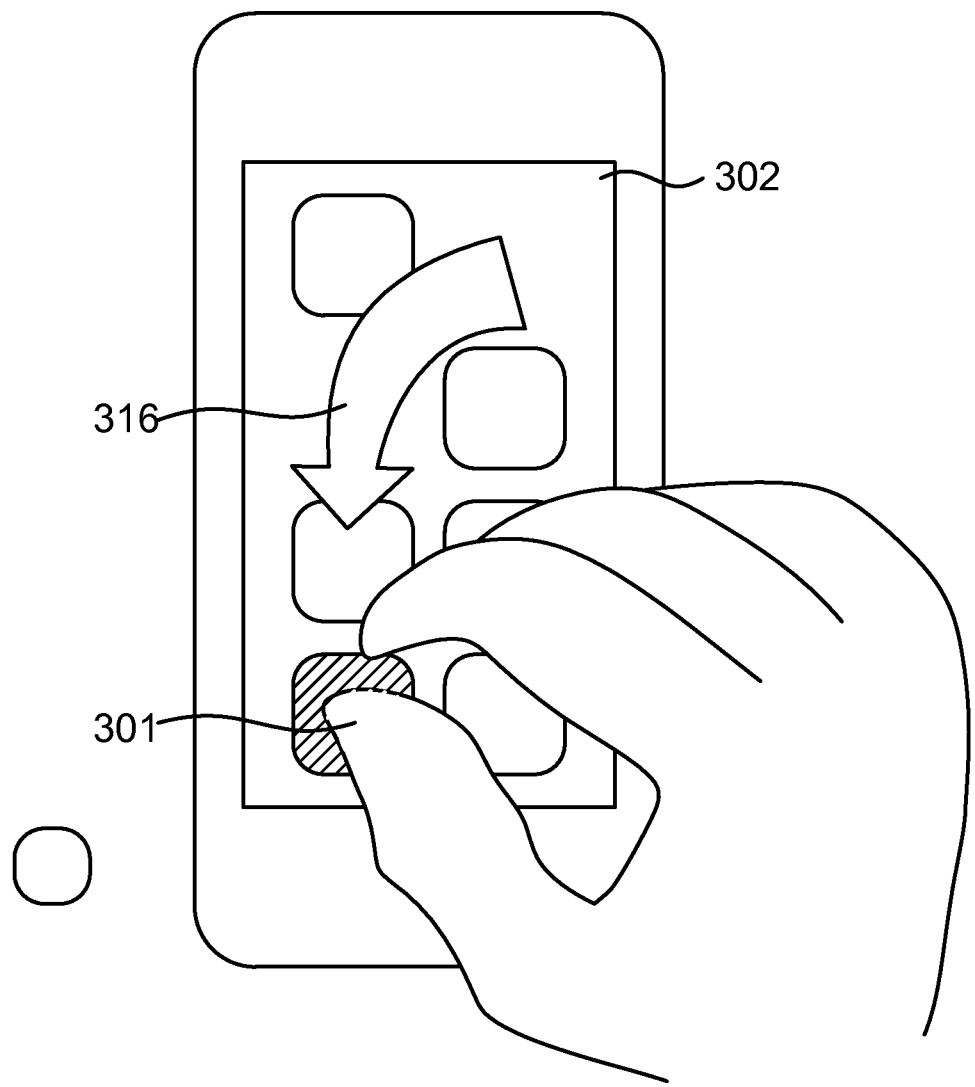

Referring now to FIGS. 3A-3C, diagrams illustrate a flow for enhancing touch with non-touch gestures according to yet another embodiment of the present disclosure. In particular, FIGS. 3A-3C illustrate an example for organizing items such as applications in a target destination such as a file.

In FIG. 3A, a user may long press with a finger at a point 301 corresponding to a target destination for one or more gathered items on a screen of a user device 302.

In FIG. 3B, the user may start selecting one or more items to be gathered and placed at the target destination. In this regard, while long pressing with a finger at point 301, the user may use other fingers of the same hand to select the one or more items, for example, items 302B. Alternatively, while long pressing with the finger at point 301, the user may use fingers from the other hand to select the one or more items.

In FIG. 3C, once the user has finished selecting the one or more items to be gathered, the user may perform a gesture such as a sweeping gesture (e.g., as indicated by arrow 316) to move the selected one or more gathered items towards the target destination indicated by the long pressing finger at point 301.

A such, the one or more items are organized into the target destination, that is, the items have been organized into an appropriate file or folder.

According to one or more embodiments of the present disclosure, various technologies may be used for enhancing touch inputs with non-touch off-screen gestures. In that regard, any gesture detection technologies may be combined with touch input technologies. Such technologies may include, for example: Hand touch onscreen plus ultrasonic gesture detection, hand touch onscreen plus vision-based gesture detection (for example using a front and/or rear-facing camera, and/or one or more cameras mounted on a side or edge of a device), ultrasonic pen touch onscreen plus hand vision detection (ultrasonic, vision-based, depth sensor, camera-based, IR, etc. . . . ), hand touch onscreen plus ultrasonic pen gesture detection, electromyography (EMG), and/or any other appropriate technologies. In this way, gestures may be detected in front of a device, behind a device, and/or on one or more sides of a device. In some embodiments, extremities may be identified and/or tracked to determine a pose or motion. For example, a pose or motion of various fingers may be identified; also, certain gesture models may be used. Touch screen technology may be used to detect touch inputs from a user, for example, capacitive touchscreens and/or projective capacitance technology. It should be noted that in various embodiments, touching on the screen may not be required. For example, touch inputs may be detected from a user touching a bezel, or even just touching an edge of a device. For example, a user may rotate a hand, e.g., to control volume, which may be detected with touch sensors located on a side, top or bottom of the device, or with electric field sensors, for example.

Figure 4:
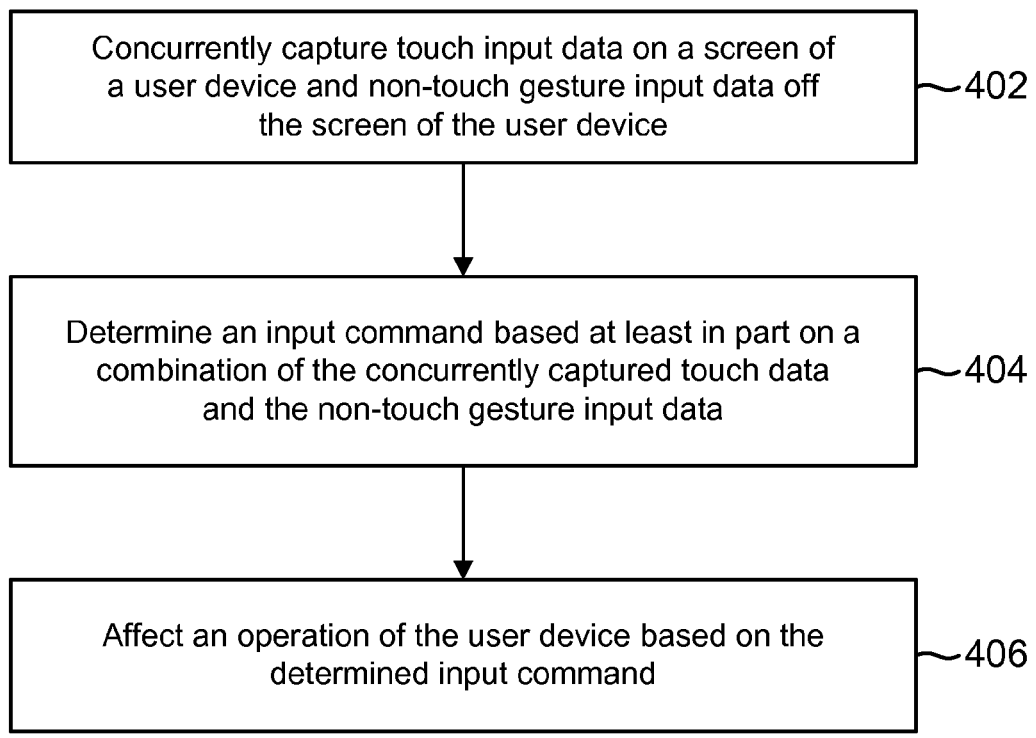
FIG. 4 is a flow diagram illustrating a method of enhancing touch inputs with non-touch gestures according to an embodiment of the present disclosure.

Referring now to FIG. 4, a flow diagram illustrates a method of enhancing touch inputs with non-touch gestures according to an embodiment of the present disclosure. It should be noted that the method illustrated in FIG. 4 may be implemented by the system illustrated in FIG. 5 according to an embodiment.

Figure 5:
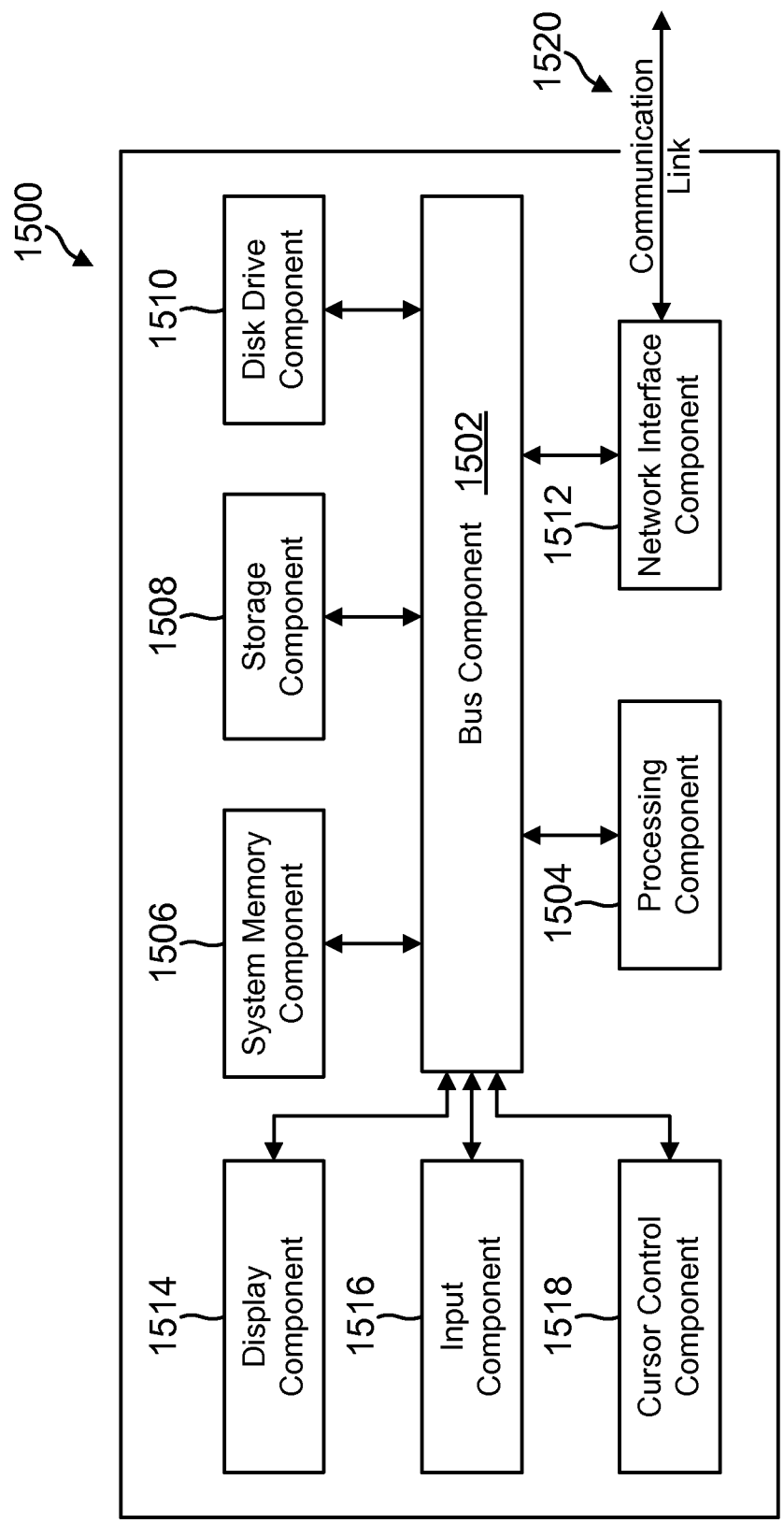
FIG. 5 is a block diagram of a system for implementing a device according to an embodiment of the present disclosure.

In block 402, a system such as system 1500 illustrated in FIG. 5 may concurrently capture touch input data on a screen of a user device and non-touch gesture input data off the screen of the user device. Touch input data and non-touch gesture input data may be captured, for example, via input component 1516 illustrated in FIG. 5 In that regard, as described above with respect to various embodiments including the embodiments illustrated in FIGS. 1-3, a user may simultaneously touch a target item on a screen or display of the user device and use a non-touch gesture (with the same hand or the other hand) to adjust an aspect of the target item. For example, the user may select a target item on a camera such as an image to be focused by touching the image on a screen or viewer of the camera. At the same time, while touching the image on the screen of the camera, the user may perform an off-screen non-touch gesture such as a hand motion or pose to adjust the focus of the image. In that regard, the off-screen, non-touch gesture may be performed, for example, by a hand motion or pose in a substantially parallel plane with respect to the screen of the user device. Also, the off-screen, non-touch gesture may be captured by one or more sensors located on the user device, for example, on the sides, the top, the bottom or the back of the user device. The sensor(s) may include various gesture detection technologies such as ultrasonic technologies, IR, or the like.

In block 404, the system may determine an input command based at least in part on a combination of the concurrently captured touch input data and the non-touch gesture input data. In block 406, an operation of the user device may be affected based on the determined input command. Such determination of the input command and its effect on an operation of the user device may be performed, for example, by processing component 1504 illustrated in FIG. 5. In an embodiment, the input command may affect a selected target item without affecting any other non-selected items.

In various embodiments, the input command may be determined to be complete when the touch input data is disengaged. For example, in the camera focus embodiment illustrated in FIGS. 1A-1C, once focusing is achieved, the user may release a touch of the target item to disengage from the target item.

According to one or more embodiments of the present disclosure, onscreen touch detection may enable off screen object (e.g., finger) detection. The off-screen object detection may then be used for operation of control. For example, a rotating finger detected off-screen may be used to control a setting or an action of an application. The onscreen touch detection or touch input may be used like an on-off switch while the non-touch gestures may be the operation control. That is, touch inputs may be an anchor point for the non-touch off-screen gestures.

It should be noted that according to one or more embodiments of the present disclosure, the terms "gesture input-sensing data", "non-touch gestures" or "gestures" may generally include off-screen non-touch gestures or interactions captured by user sensors of a device other than touch screen interactions, and may include, for example, non-touch hand motions or poses. As such, in embodiments herein, non-touch gestures may include detecting or recognizing a user's interactive input such as a hand pose. In various embodiments, "gesture input-sensing data" may include the use of data from sensors located at least at one or more points or areas of a device (e.g., sides, top, bottom, rear) other than touch sensors, or data from interactions other than those performed on or directly above a touch screen, to interpret user actions into a control input. That is, gesture input data may involve the use of sensors or technologies to capture a user's off-screen gestures without touching a user device.

In general, user devices may include or be a part of any device that includes gesture recognition or gesture input data sensors, which may include, for example: ultrasonic gesture detection sensors, image or video capturing components such as a camera (e.g., a visible-light camera, a range imaging camera such as a time-of-flight camera, structured light camera, stereo camera, or the like), hand vision detection (ultrasonic, vision-based, IR, etc.) sensors, ultrasonic pen gesture detection sensors, etc. That is, the devices may have ultrasonic, IR, vision-based gesture capabilities, etc. to capture a user's off-screen gestures without touching a device (i.e., non-touch gestures such as a hand pose).

In various embodiments, a touch input may affect operation of other sensors. For example, a touch input may turn on other sensors or increase a duty cycle of such other devices, for example. Also, a touch input may cause an adjustment to the gestures which the other sensors are configured to detect. For example, instead of being sensitive to an engagement pose to initiate gesture control, the touch input may alert the device to look for gestures such as swipes, sweeps, poses, etc. other than the engagement pose. In some embodiments, this may be effected by loading one or more gesture models, increasing a size or scope of a gesture vocabulary, and/or in any other number of ways.

With respect to capturing off-screen non-touch gestures according to one or more embodiments, a user's movement or orientation of an object (e.g., one or more fingers, hands, pen, etc.) beyond a surface of a user device, e.g., beyond a screen, may be substantially parallel to the surface of the user device, e.g., the screen or display. In various examples, an object's motion in parallel to the surface of the device may include a sweeping motion, a thumb rotation, etc. beyond a screen or display boundaries, on the same plane as a display or screen of the device, and although movement in a z-direction may be considered in some embodiments, it may not be the only considered movement or may not be considered in some embodiments. In that regard, a z-direction movement may be, for example, a motion in a direction toward or away from the screen or display, for example to increase or decrease the proximity to the display. That is, an object's motion may be performed outside a perimeter of the screen and aligned with the screen. In some embodiments, gestures may be detected when aligned with a screen (e.g., when using a tablet or larger form factor).

Referring now to FIG. 5, a block diagram of a system for implementing a device is illustrated according to an embodiment of the present disclosure.

It will be appreciated that the methods and systems disclosed herein may be implemented by or incorporated into a wide variety of electronic systems or devices. For example, a system 1500 may be used to implement any type of device including wired or wireless devices such as a mobile device, a smart phone, a Personal Digital Assitant (PDA), a tablet, a laptop, a personal computer, a TV, or the like. Other exemplary electronic systems such as a music player, a video player, a communication device, a network server, etc. may also be configured in accordance with the disclosure. Furthermore, other electronic systems may include a wearable device, e.g., mounted on a user's wrist, which may detect gestures or other control inputs and then pass them to another device for processing.

System 1500 may be suitable for implementing embodiments of the present disclosure, including user devices 102, 202, and 302 illustrated in FIGS. 1, 2, and 3, respectively. System 1500, such as part of a device, e.g., smart phone, tablet, personal computer and/or a network server, includes a bus 1502 or other communication mechanism for communicating information, which interconnects subsystems and components, including one or more of a processing component 1504 (e.g., processor, micro-controller, digital signal processor (DSP), etc.), a system memory component 1506 (e.g., RAM), a static storage component 1508 (e.g., ROM), a network interface component 1512, a display component 1514 (or alternatively, an interface to an external display), an input component 1516 (e.g., keypad or keyboard, interactive input component such as a touch screen, gesture recognition, etc.), and a cursor control component 1518 (e.g., a mouse pad). In various embodiments, input component 1516 may implement one or more gesture detection technologies that may be combined with touch input technologies. As described above, such technologies may include, for example: Hand touch onscreen plus ultrasonic gesture detection, hand touch onscreen plus vision-based gesture detection (for example using a front and/or rear-facing camera, and/or one or more cameras mounted on a side or edge of a device), ultrasonic pen touch onscreen plus hand vision detection (ultrasonic, vision-based, depth sensor, camera-based, IR, etc. . . . ), hand touch onscreen plus ultrasonic pen gesture detection, electromyography (EMG), projective capacitance, electric field sensors, and/or any other appropriate technologies.

In accordance with embodiments of the present disclosure, system 1500 performs specific operations by processing component 1504 executing one or more sequences of one or more instructions contained in system memory component 1506. Such instructions may be read into system memory component 1506 from another computer readable medium, such as static storage component 1508. These may include instructions to enhance interactive inputs via simultaneous multimodal sensor fusion. In other embodiments, hard-wired circuitry may be used in place of or in combination with software instructions for implementation of one or more embodiments of the disclosure.

Logic may be encoded in a computer readable medium, which may refer to any medium that participates in providing instructions to processing component 1504 for execution. Such a medium may take many forms, including but not limited to, non-volatile media, volatile media, and transmission media. In various implementations, volatile media includes dynamic memory, such as system memory component 1506, and transmission media includes coaxial cables, copper wire, and fiber optics, including wires that comprise bus 1502. In an embodiment, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read. The computer readable medium may be non-transitory.

In various embodiments of the disclosure, execution of instruction sequences to practice the disclosure may be performed by system 1500. In various other embodiments, a plurality of systems 1500 coupled by communication link 1520 (e.g., WiFi, or various other wired or wireless networks) may perform instruction sequences to practice the disclosure in coordination with one another. System 1500 may receive and extend inputs, messages, data, information and instructions, including one or more programs (i.e., application code) through communication link 1520 and network interface component 1512. Received program code may be executed by processing component 1504 as received and/or stored in disk drive component 1510 or some other non-volatile storage component for execution.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for detecting interactive inputs, comprising:
    capturing touch input data on a screen of a user device, the touch input data being indicative of a touch performed on the screen of the user device;
    determining an input command based on the touch input data;
    affecting an operation of the user device based on the touch input data, wherein the operation impacts display of content on the screen of the user device;
    capturing non-touch gesture input data, the gesture input data being indicative of a gesture performed in an area offset from the screen of the user device, and the gesture input data relating to the determined input command; and
    further affecting the operation of the user device based on the determined input command and gesture input data.

2. The method of claim 1, wherein the touch input data identifies a target item on the screen of the user device, and wherein the input command comprises an adjustment of an aspect of the target item based on the gesture input data.

3. The method of claim 2, wherein the input command comprises a variable adjustment of the target item, the variable adjustment being determined from the gesture input data.

4. The method of claim 1, wherein the capturing the touch input data further comprises receiving a touch, from a user on the screen of the user device, on a desired target item to be affected; and
determining that the target item has been disengaged by detecting a release of the touch on the screen of the user device.

5. The method of claim 1, wherein the capturing the non-touch, gesture input data comprises detecting a location and a movement of an object.

6. The method of claim 5, wherein the movement of the object further comprises a movement substantially in a same plane as the screen of the user device.

7. The method of claim 1, wherein the capturing the non-touch, gesture input data comprises using one or more sensors adapted to detect an object beyond a surface of the user device via ultrasonic technologies, image or video capturing technologies, or IR technologies.

8. The method of claim 1, wherein the determined input command comprises one of a plurality of different types of inputs indicating selection of a target item on the screen of the user device.

9. The method of claim 8, wherein the different types of inputs further comprise a right-mouse click (RMC) created by a first pose of a hand touching the screen, or a left-mouse click (LMC) or an alternate click created by a second pose of the hand touching the screen, the first pose being different than the second pose.

10. The method of claim 1, wherein the capturing the non-touch, gesture input data comprises capturing a hand pose or a hand motion.

11. A system comprising:
a display configured to display one or more images;
one or more sensors configured to detect touch input data at the display;
one or more sensors configured to detect non-touch gesture input data indicative of a gesture performed in an area offset from the display; and
one or more processors configured to:
capture the touch input data, the touch input data being indicative of a touch performed on the display;
determine an input command based on the touch input data;
affect an operation of the system based on the touch input data, wherein the operation impacts content on the display;
capture the non-touch gesture input data, the gesture input data relating to the determined input command; and
further affecting the operation of the system based on the determined input command and gesture input data.

12. The system of claim 11, wherein the touch input data identifies a target item on the display, and wherein the input command comprises an adjustment of an aspect of the target item based on the gesture input data.

13. The system of claim 12, wherein the input command comprises a variable adjustment of the target item, the variable adjustment being determined from the gesture input data.

14. The system of claim 11, wherein the processor is further configured to receive a touch from a user on the display on a desired target item and determine that the target item has been disengaged by detecting a release of the touch on the display.

15. The system of claim 11, wherein the one or more sensors configured to detect non-touch gesture input data are further configured to capture a location and a movement of an object.

16. The system of claim 15, wherein the movement of the object further comprises a movement substantially in a same plane as the display.

17. The system of claim 16, wherein the one or more sensors configured to detect non-touch gesture input data comprise ultrasonic sensors, image or video capturing sensors, or IR sensors adapted to capture the non-touch gesture input data.

18. The system of claim 11, wherein the determined input command comprises one of a plurality of different types of inputs indicating selection of a target item on the display.

19. The system of claim 18, wherein the different types of further comprise a right-mouse click (RMC) created by a first pose of a hand touching the display, or a left-mouse click (LMC) or an alternate click created by a second pose of the hand touching the display, the first pose being different than the second pose.

20. The system of claim 11, wherein the one or more sensors configured to detect non-touch gesture input data are configured to capture a hand pose or a hand motion.

21. An apparatus for detecting interactive inputs, comprising:
means for capturing touch input data on a screen of a user device, the touch input data being indicative of a touch performed on the screen of the user device;
means for determining an input command based on the touch input data;
means for affecting an operation of the user device based on the touch input data, wherein the operation impacts display of content on the screen of the user device;
capturing non-touch gesture input data, the gesture input data being indicative of a gesture performed in an area offset from the screen of the user device, and the gesture input data relating to the determined input command; and
means for further affecting the operation of the user device based on the determined input command and gesture input data.

22. The apparatus of claim 21, wherein the touch input data identifies a target item on the screen of the user device, and wherein the input command comprises an adjustment of an aspect of the target item based on the gesture input data.

23. The apparatus of claim 22, wherein the input command comprises a variable adjustment of the target item, the variable adjustment being determined from the gesture input data.

24. The apparatus of claim 21, wherein the means for capturing the touch input data comprises means for receiving a touch, from a user on the screen of the user device, on a desired target item to be affected; and
wherein the apparatus further comprises determining that the target item has been disengaged by detecting a release of the touch on the screen of the user device.

25. The apparatus of claim 21, wherein the means for capturing the non-touch, gesture input data comprises means for detecting a location and a movement of an object.

26. The apparatus of claim 25, wherein the movement of the object further comprises a movement substantially in a same plane as the screen of the user device.

27. The apparatus of claim 21, wherein the means for capturing the non-touch, gesture input data comprises one or more sensors adapted to detect an object beyond a surface of the apparatus via ultrasonic technologies, image or video capturing technologies, or IR technologies.

28. The apparatus of claim 21, wherein the determined input command comprises one of a plurality of different types of inputs indicating selection of a target item on the screen of the user device.

29. The apparatus of claim 28, wherein the different types of inputs further comprise a right-mouse click (RMC) created by a first pose of a hand touching the screen, or a left-mouse click (LMC) or an alternate click created by a second pose of the hand touching the screen, the first pose being different than the second pose.

30. The apparatus of claim 21, wherein the means for capturing the non-touch, gesture input data comprises means for capturing a hand pose or a hand motion.

31. A non-transitory computer readable medium on which are stored computer readable instructions which, when executed by a processor, cause the processor to:

capture touch input data on a screen of a user device, the touch input data being indicative of a touch performed on the screen of the user device;

determining an input command based on the touch input data;

affecting an operation of the user device based on the touch input data, wherein the operation impacts display of content on the screen of the user device;

capturing non-touch gesture input data, the gesture input data being indicative of a gesture performed in an area offset from the screen of the user device, the gesture input data relating to the determined input command; and further affecting the operation of the user device based on the determined input command and gesture input data.

* * * * *